(12) United States Patent
Detemple

(10) Patent No.: US 9,175,773 B2
(45) Date of Patent: Nov. 3, 2015

(54) SEALING DEVICE FOR SEALING A VERTICAL GAP BETWEEN ADJACENT WALL PANELS, SUCH AS GLASS PANES, WHICH FORM PART OF A MACHINE ENCLOSURE

(75) Inventor: Thomas Detemple, Planegg (DE)

(73) Assignee: KHS GmbH, Dortmund (DE)

( * ) Notice: Subject to any disclaimer, the term of this patent is extended or adjusted under 35 U.S.C. 154(b) by 248 days.

(21) Appl. No.: 12/834,051

(22) Filed: Jul. 12, 2010

(65) Prior Publication Data
US 2011/0162907 A1 Jul. 7, 2011

Related U.S. Application Data

(63) Continuation-in-part of application No. PCT/EP2008/009080, filed on Oct. 28, 2008.

(30) Foreign Application Priority Data

Jan. 22, 2008 (DE) .................. 10 2008 005 606

(51) Int. Cl.
F16J 15/02 (2006.01)
F16J 15/06 (2006.01)
(Continued)

(52) U.S. Cl.
CPC ............ F16J 15/061 (2013.01); B65D 53/00 (2013.01); F16J 15/021 (2013.01); F16J 15/028 (2013.01); F16J 15/3208 (2013.01)

(58) Field of Classification Search
CPC ......... F16J 15/06; F16J 15/021; F16J 15/028; F16J 15/3208; F16J 15/061; B65D 53/00

USPC ................ 52/223.7, 465, 273; 277/644, 648; 68/235 R
See application file for complete search history.

(56) References Cited

U.S. PATENT DOCUMENTS 2,956,314 A * 10/1960 Rowe et al. ................ 52/204.57
3,230,677 A * 1/1966 Brown ............................ 52/208
(Continued)

FOREIGN PATENT DOCUMENTS

DE 938 281 C 1/1956
DE 71 39 295 U 2/1972
(Continued)

OTHER PUBLICATIONS

International Search Report PCT/EP2008/009080 and English translation thereof.
(Continued)

*Primary Examiner* — Andrew J Triggs
(74) *Attorney, Agent, or Firm* — Nils H. Ljungman & Associates

(57) ABSTRACT

A bottling plant with a machine enclosure, which machine enclosure comprises resilient seals to permit cleaning fluid from inside the machine enclosure to exit through the resilient seals, and a resilient seal structure. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

19 Claims, 8 Drawing Sheets

(51) Int. Cl.
*F16J 15/32* (2006.01)
*B65D 53/00* (2006.01)

(56) References Cited

U.S. PATENT DOCUMENTS

| | | | | |
|---|---|---|---|---|
| 3,267,631 | A * | 8/1966 | Hammitt | 52/771 |
| 3,446,201 | A * | 5/1969 | More | 126/39 R |
| 4,223,660 | A | 9/1980 | Lang | |
| 4,462,390 | A * | 7/1984 | Holdridge et al. | 126/587 |
| 4,956,954 | A * | 9/1990 | Horgan, Jr. | 52/204.53 |
| 5,481,839 | A * | 1/1996 | Lang et al. | 52/235 |
| 5,516,185 | A * | 5/1996 | O'Donnell et al. | 296/166 |
| 5,937,599 | A * | 8/1999 | Gerischer et al. | 52/282.5 |
| 7,090,226 | B1 * | 8/2006 | Trainor et al. | 277/630 |
| 7,797,899 | B2 * | 9/2010 | Linn et al. | 52/465 |
| 8,196,931 | B2 * | 6/2012 | Burgess | 277/312 |
| 2007/0134457 | A1 * | 6/2007 | Dobelle | 428/36.9 |
| 2010/0317280 | A1 * | 12/2010 | Detemple | 454/187 |
| 2011/0162907 | A1 * | 7/2011 | Detemple | 181/200 |

FOREIGN PATENT DOCUMENTS

| | | |
|---|---|---|
| DE | 197 23 954 A | 3/1998 |
| DE | 20 2004 001 619 U1 | 5/2004 |
| JP | 59187959 U | 12/1984 |
| JP | 8080738 A | 3/1996 |
| JP | 9100918 A | 4/1997 |
| JP | 9328846 A | 12/1997 |
| JP | 3088251 U | 6/2002 |
| JP | 2003527973 A | 9/2003 |
| JP | 2004-215678 A | 8/2004 |

OTHER PUBLICATIONS

German Office Action 10 2008 005 606.5-25.

* cited by examiner

SEALING DEVICE FOR SEALING A VERTICAL GAP BETWEEN ADJACENT WALL PANELS, SUCH AS GLASS PANES, WHICH FORM PART OF A MACHINE ENCLOSURE

CONTINUING APPLICATION DATA

This application is a Continuation-In-Part application of International Patent Application No. PCT/EP2008/009080, filed on Oct. 28, 2008, which claims priority from Federal Republic of Germany Patent Application No. 10 2008 005 606.5, filed on Jan. 22, 2008. International Patent Application No. PCT/EP2008/009080 was pending as of the filing date of this application. The United States was an elected state in International Patent Application No. PCT/EP2008/009080.

BACKGROUND

1. Technical Field

The present application relates to a bottling plant with a machine enclosure, which machine enclosure comprises resilient seals to permit cleaning fluid from inside the machine enclosure to exit through the resilient seals, and a resilient seal structure.

2. Background Information

Background information is for informational purposes only and does not necessarily admit that subsequently mentioned information and publications are prior art.

There are a series of applications in which it is possible to provide machines with a so-called enclosure. This can be possible for different reasons, for instance for sound insulation, for protecting against splashing when liquids are used and to provide a barrier in order to prevent, restrict, and/or minimize anyone inadvertently approaching the correspondingly enclosed machines or to prevent, restrict, and/or minimize anyone approaching them without authorization.

When foodstuffs are packaged, hygiene reasons already make it necessary and/or desired to have such an enclosure. In this case this is a border or barrier around the machines or respectively to protect corresponding transport sections within a production, filling and packing installation, not least on account of environmental protection and safety at work.

Machines that process foodstuffs, may be intensively cleaned, e.g. using high-pressure cleaners. This not only refers to the machines but also to the enclosures.

If the claddings or enclosures of the machines are realized as rigid structural parts, problems can arise during cleaning, for example, in the transition regions from one wall element to another wall element, as the wall elements, may have assembly frames that can themselves act as dirt traps during the cleaning process so that these corners and edges or transition regions, require and/or desire intensive cleaning.

OBJECT OR OBJECTS

An object of which is to be able to clean the transition regions of these types of wall faces, panels or glass panels in an efficient or substantially efficient manner.

SUMMARY

The present application centers on a device for sealing vertical or substantially vertical joints between plate-shaped wall elements, in one possible embodiment between wall faces of components forming a machine enclosure, such as glass panes or the like.

Using a device of the aforementioned type, this object is achieved according to the present application in that the seal is formed by a sealing cord that is made of resilient material, said sealing cord sealing the joint and being clamped between the two joint ends.

In one possible embodiment of the present application, it has been shown that the reason this solution leads to good cleaning results is because the jet of the high-pressure cleaner, when cleaning the edges of the glass panels, is able to lift the sealing cord in such a manner that the cleaning jet can spray from inside the enclosure to the outside in such a manner that the particles of dirt transported and removed are then also moved outside the enclosure. At the same time, the sealing cord provides a very good seal of the respective joints outside the cleaning periods.

In this case it can be possible when the sealing cord is provided on at least one of its free ends with a tensioning ball that protects, in one possible embodiment, the edges of the glass panels.

As mentioned above, it is provided that the sealing cord is clamped at the outwardly facing outer edge of the ends of the abutting faces of the panel elements in such a manner that when the jet of a high-pressure cleaning device impinges on the interior of the housing, the sealing cord is able to yield.

It can also be possible for the sealing cord to be secured at its upper end in a securing element that engages over the joint to be sealed. Consequently it is possible to provide a rapid assembly possibility in each joint by snapping a sealing cord of this type onto the upper edge region of the glass panels. Once the cord has been snapped on, it simply needs locking or may be locked in at the lower end, for example, of the tensioning ball provided.

According to the present application it can also be provided that the sealing cord is realized for identifying danger areas in a signal color.

Depending on the purpose and structural conditions, it can be provided that the cross section of the sealing cord is round or oval, it being possible in a further development for the sealing cord to be used to adjust the pre-tensioning force in a threaded sleeve or the like at one end.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further features, details and embodiments of the present application are produced on account of the following description and by way of the drawing, in which.

DESCRIPTION OF EMBODIMENT OR EMBODIMENTS

The device, given the general reference 1, for sealing the vertical or substantially vertical joints, given the reference 2, between two plate-shaped wall elements, e.g. glass panels 3, is formed by a sealing cord 4 made of a resilient material, e.g. a physiologically harmless rubber material.

Figure 1:
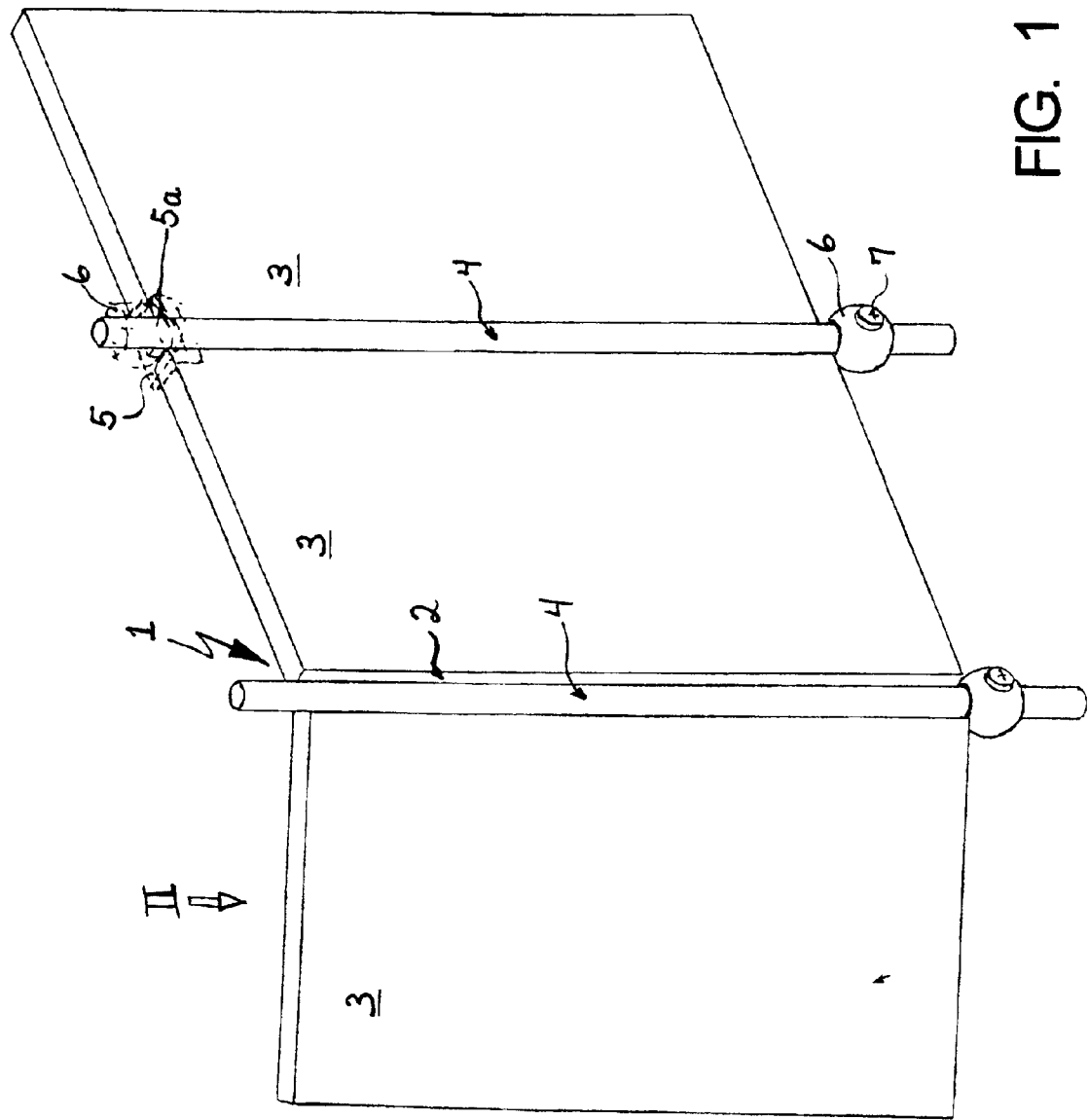
FIG. 1 shows a simplified representation of a detail from an enclosure with sealing cords in the transition regions from one panel to another.

As can be seen in FIG. 1, for example, a securing element 5 can be provided at the upper region of two adjacent glass panels 3, said securing element, for example, being clipped over the upper end edges and having an accommodating means or a passage 5a for passing through the sealing cord 4.

In order to give the sealing cord 4 the necessary and/or desired tension, it is clamped, for example, on both sides in a securing ball 6, a clamping pin or screw pin 7 being indicated to this end in the Figures, it being possible to tighten said clamping pin or screw pin once the sealing cord has been placed in position and prestressed in order to secure the sealing cord in this way.

Once the sealing cord 4 has been secured, for optimum sealing of the respective joint 2 it lies in line contact on the edges of the glass panels, as represented in the Figures, substantially on the outside of the glass panes. Consequently it is possible that by means of the jet of a high-pressure cleaning element it can be lifted towards the outside, in such a manner that all or substantially all or most of the particles of dirt can then also be transported to the outside.

Figure 1A:
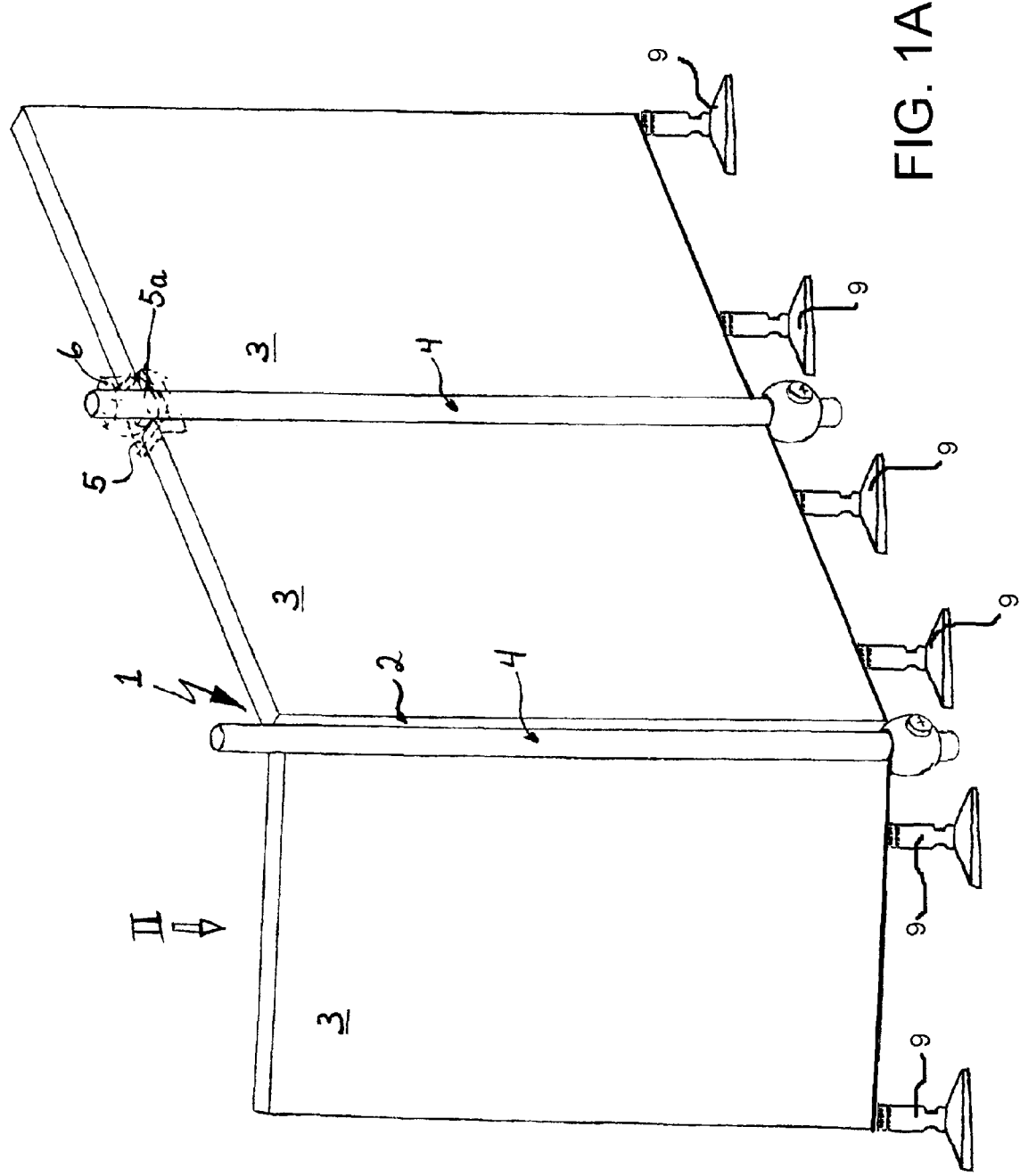
FIG. 1A shows a simplified representation of a detail from an enclosure including stands.

FIG. 1A shows one possible embodiment of the present application which is similar to that seen in FIG. 1. FIG. 1A shows the device 1, joint 2, panel 3, sealing cord 4, securing element 5, securing ball 6, and screw pin 7, as well as stand elements 9. The stand elements 9 may support the glass panels 3 from the floor. The securing elements 5, which may be clipped or otherwise secured to the panels 3, may hold the glass panels 3 together to produce a wall or partition surrounding or substantially surrounding machinery to dampen and/or reduce noise generated by the machinery. In other possible embodiments, other stands or stand elements or stand arrangements may be utilized.

Figure 1B:
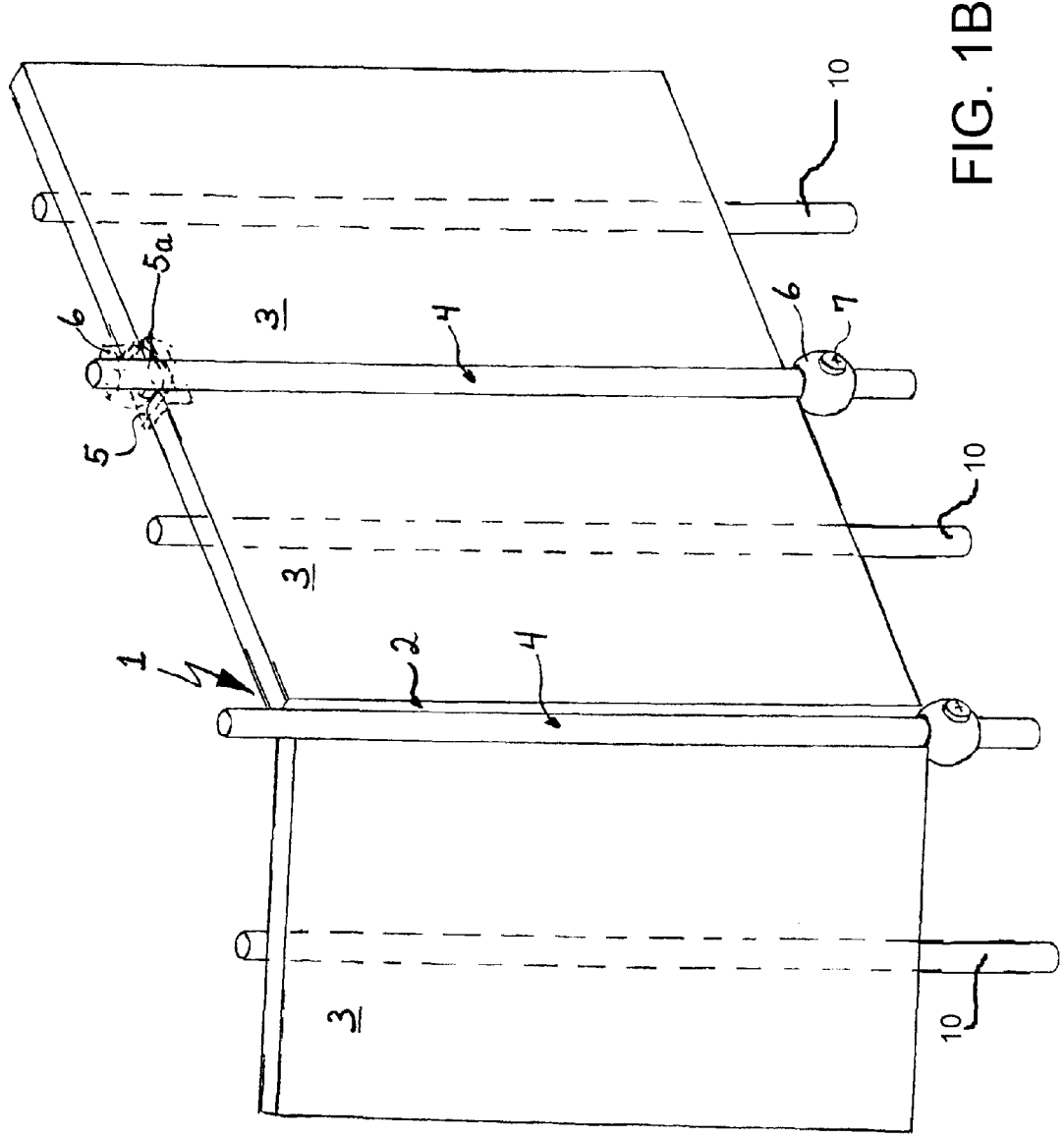
FIG. 1B shows a simplified representation of a detail from an enclosure including rods or columns.

FIG. 1B shows another possible embodiment of the present application including rods or columns 10. The rods 10 may support the panels 3. In one possible embodiment, one rod or column 10 may support each panel 3. In other embodiments, two or more rods 10 may support each panel 3. The columns 10 may be mounted on the inside of the wall produced by the panels 3, or the columns 10 may be mounted on the outside of the wall produced by the panels 3. The rods or columns 10 may be connected to the floor to support the panels 3.

Figure 1C:
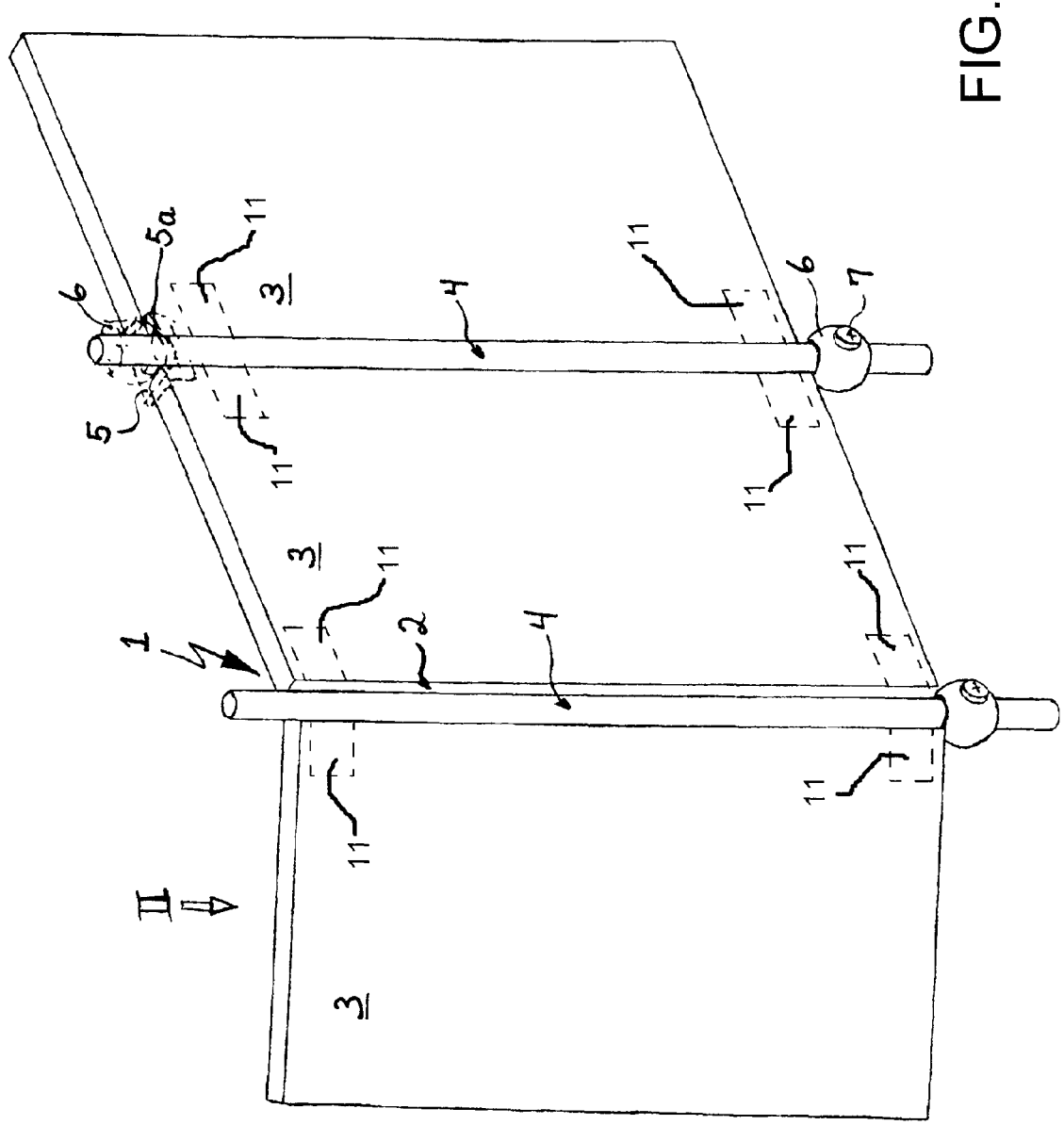
FIG. 1C shows a simplified representation of a detail from an enclosure including hinges.

FIG. 1C shows one possible embodiment of the present application utilizing hinges 11. The hinges 11 may connect the panels 3 and support the panels 3. The embodiment seen in FIG. 1A shows two sets of hinges connecting each panel 3 to another panel 3. In other possible embodiments, less hinges or more hinges may be used to connect each panel 3 to another panel 3. In another possible embodiment of the present application, the device 1 may comprise brackets 11. The brackets 11 may hold the glass panels 3 at predetermined angles with respect to one another to form the machine enclosure around machinery.

Figure 2:
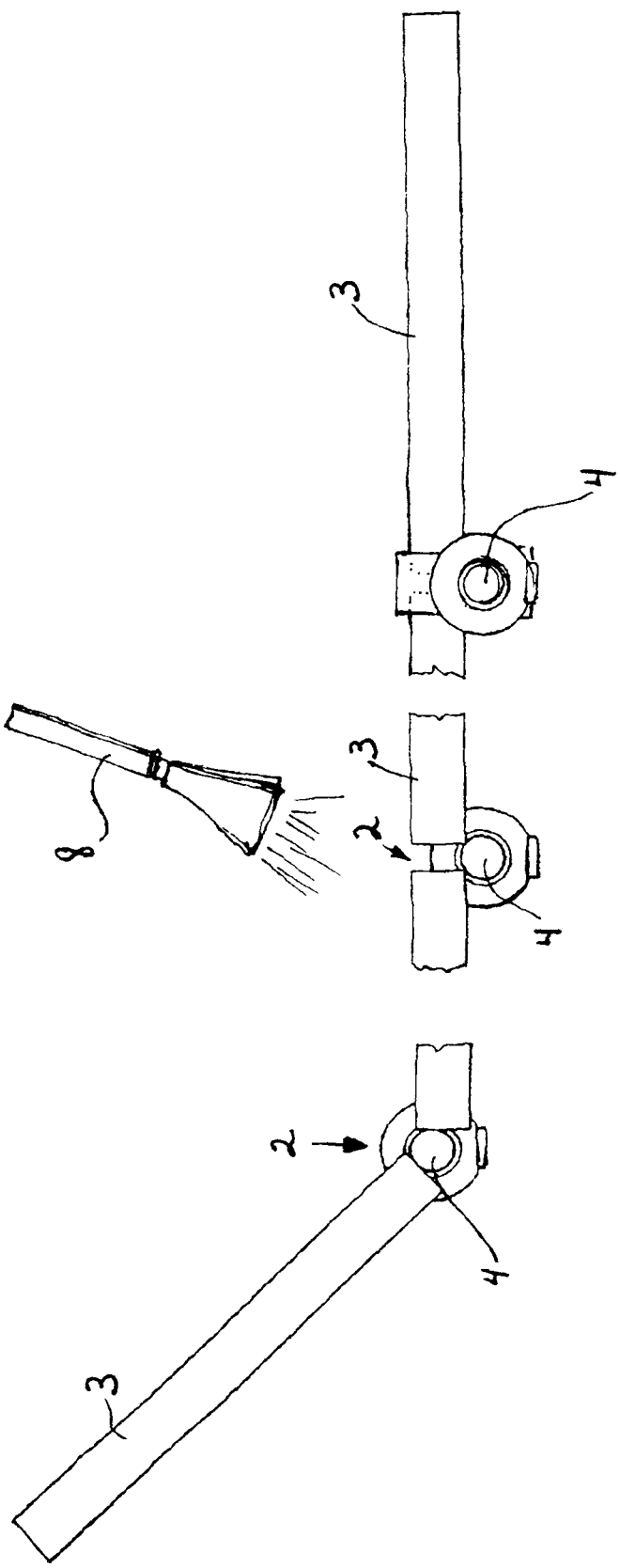
FIG. 2 shows a top view according to arrow II in FIG. 1.

In one possible embodiment of the present application, which may be seen in FIG. 2, the high-pressure cleaning element 8 may direct a cleaning medium or cleaning fluid toward the glass panels 3. The sealing cord 4 may be disposed between glass panels 3. When the high-pressure cleaning element 8 is spraying or ejecting cleaning medium or cleaning fluid against the panels 3, the sealing cord 4 may yield and thus permit cleaning medium or fluid, as well as dirt, to pass through the gaps between the panels 3. When the high-pressure cleaning element 8 stops spraying liquid or fluid against the panels 3 and cord 4, the tensioned sealing cord 4 may then move back into place between the panels 3 and seal the gap between the glass panels 3.

Naturally, the described possible embodiment of the present application can also be modified in many respects without departing from the basic concept. Thus, the present application is not limited to the represented cross-sectional form of the sealing cord, it can be oval, polygonal or have any other cross-sectional shape, neither is the present application limited to the type of the securing of the sealing cord on the wall elements 3, in this case too other devices can be provided, for instance the version of the sealing cord on a threaded sleeve that can then be screw-connected and tensioned in a stationary thread, e.g. a pedestal of the wall elements.

In one possible embodiment of the present application, the glass panels 3 may be used to enclose machinery and dampen and/or reduce noise.

Figure 3:
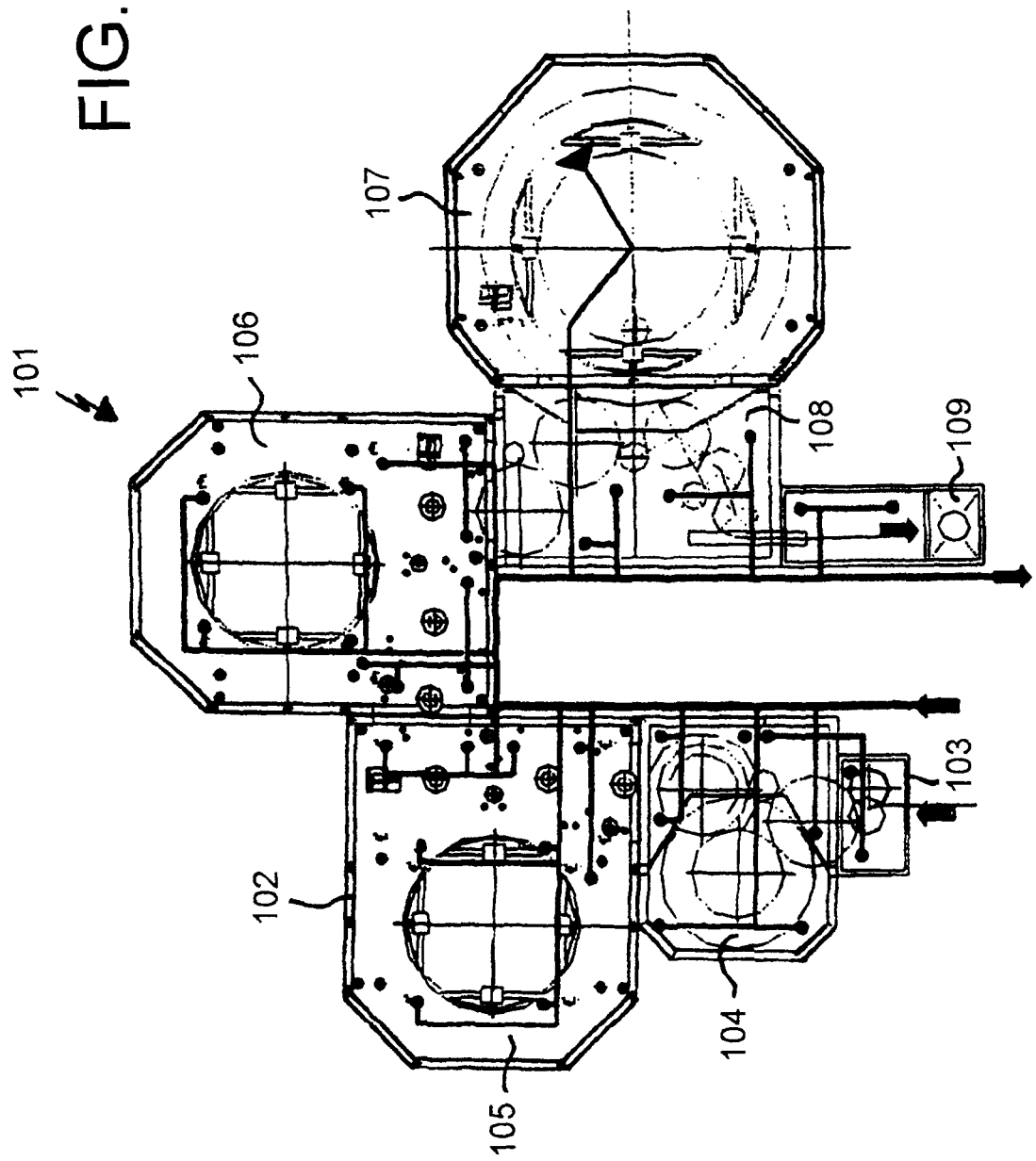
FIG. 3 shows a basic schematic plan view of a clean room filling device, which may utilize the device of the present application.

FIG. 3 may show one possible embodiment of a filling plant for filling and closing glass bottles in a clean room. The walls of the clean room may comprise the wall partitions of the present application. A machine designated in its entirety as 101 for the filling of containers, for example for bottles or cans with beverages, etc., is shown in greater detail in FIG. 3. The complete machine may be enclosed in a housing 102, which may protect the entire interior from contaminants from the outside so that clean room conditions prevail in the interior.

The machine 101 may comprise a container opening 103, through which the bottles to be filled may gain admission to the interior of the machine. The containers may then be sterilized in a sterilization device 104. The containers may move around a circular track together with a plurality of vaporization heads that may direct vaporous $H_2O_2$ into the interior and the upper outer region of the container. Due to the temperature differences between the vaporized $H_2O_2$ and the wall of the container, the sterilizing agent may precipitate and form a condensation film. The containers may then be conveyed into a first activation device 105, in which hot air or hot steam may be directed against the outside or the inside of the container. This may initiate a decomposition reaction in the deposited $H_2O_2$, in which it may decompose via a number of intermediate steps. During the reaction, any germs or impurities present may be attacked and broken down by the reaction products produced intermittently, until essentially only water and a few residual decomposition products may remain.

Because the reaction requires and/or desires some time, once the containers have completed a partial rotation through the first activation device 105, the containers may also complete another rotation in a second activation device 106 downstream of the first, so that there may be sufficient time for the decomposition reaction to be completed when the end of the second activation device 6 is reached. The bottles may then move into a filling device 107, in which the bottles may be filled as they move around the machine before they may be closed in a closing device 108. They then may leave the bottling machine through the container outlet 109.

To maintain the clean room conditions in the interior of the machine 101, the interior must be or should be sterilized periodically. The method according to the present application may be performed as follows:

First productive operation of the machine may be stopped, in one possible embodiment the supply of bottles may be interrupted and the various machines in the interior of the machine 101 may be shut down. The cleaning cycle may then be started.

Figure 4:
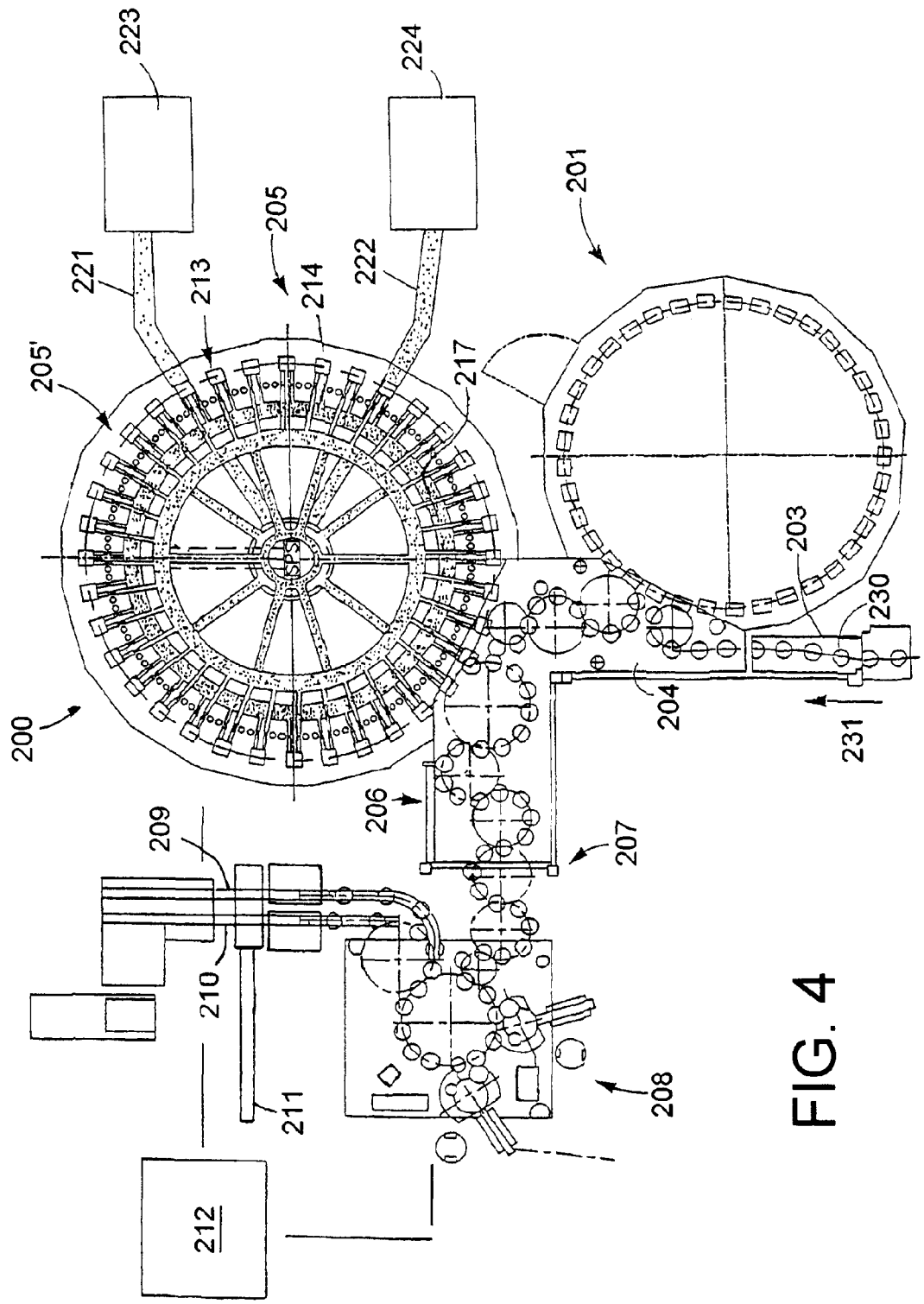
FIG. 4 shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows schematically the main components of one possible embodiment example of a system for filling containers, specifically, a beverage bottling plant for filling bottles 230 with at least one liquid beverage, in accordance with at least one possible embodiment, in which system or plant could possibly be utilized at least one aspect, or several aspects, of the embodiments disclosed herein.

FIG. 4 shows a rinsing arrangement or rinsing station 201, to which the containers, namely bottles 230, are fed in the direction of travel as indicated by the arrow 231, by a first conveyer arrangement 203, which can be a linear conveyor or a combination of a linear conveyor and a starwheel. Downstream of the rinsing arrangement or rinsing station 201, in the direction of travel as indicated by the arrow 231, the rinsed bottles 230 are transported to a beverage filling machine 205 by a second conveyer arrangement 204 that is formed, for example, by one or more starwheels that introduce bottles 230 into the beverage filling machine 205.

The beverage filling machine 205 shown is of a revolving or rotary design, with a rotor 205', which revolves around a central, vertical machine axis. The rotor 205' is designed to receive and hold the bottles 230 for filling at a plurality of filling positions 213 located about the periphery of the rotor 205'. At each of the filling positions 203 is located a filling arrangement 214 having at least one filling device, element, apparatus, or valve. The filling arrangements 214 are designed to introduce a predetermined volume or amount of liquid beverage into the interior of the bottles 230 to a predetermined or desired level.

The filling arrangements 214 receive the liquid beverage material from a toroidal or annular vessel 217, in which a supply of liquid beverage material is stored under pressure by a gas. The toroidal vessel 217 is a component, for example, of the revolving rotor 205'. The toroidal vessel 217 can be connected by means of a rotary coupling or a coupling that permits rotation. The toroidal vessel 217 is also connected to at least one external reservoir or supply of liquid beverage material by a conduit or supply line. In the embodiment shown in FIG. 4, there are two external supply reservoirs 223 and 224, each of which is configured to store either the same liquid beverage product or different products. These reservoirs 223, 224 are connected to the toroidal or annular vessel 217 by corresponding supply lines, conduits, or arrangements 221 and 222. The external supply reservoirs 223, 224 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 214 could be connected by separate connections to each of the two toroidal vessels and have two individually-controllable fluid or control valves, so that in each bottle 230, the first product or the second product can be filled by means of an appropriate control of the filling product or fluid valves.

Downstream of the beverage filling machine 205, in the direction of travel of the bottles 230, there can be a beverage bottle closing arrangement or closing station 206 which closes or caps the bottles 230. The beverage bottle closing arrangement or closing station 206 can be connected by a third conveyer arrangement 207 to a beverage bottle labeling arrangement or labeling station 208. The third conveyor arrangement may be formed, for example, by a plurality of starwheels, or may also include a linear conveyor device.

In the illustrated embodiment, the beverage bottle labeling arrangement or labeling station 208 has at least one labeling unit, device, or module, for applying labels to bottles 230. In the embodiment shown, the labeling arrangement 208 is connected by a starwheel conveyer structure to three output conveyer arrangements: a first output conveyer arrangement 209, a second output conveyer arrangement 210, and a third output conveyer arrangement 211, all of which convey filled, closed, and labeled bottles 230 to different locations.

The first output conveyer arrangement 209, in the embodiment shown, is designed to convey bottles 230 that are filled with a first type of liquid beverage supplied by, for example, the supply reservoir 223. The second output conveyer arrangement 210, in the embodiment shown, is designed to convey bottles 230 that are filled with a second type of liquid beverage supplied by, for example, the supply reservoir 224. The third output conveyer arrangement 211, in the embodiment shown, is designed to convey incorrectly labeled bottles 230. To further explain, the labeling arrangement 208 can comprise at least one beverage bottle inspection or monitoring device that inspects or monitors the location of labels on the bottles 230 to determine if the labels have been correctly placed or aligned on the bottles 230. The third output conveyer arrangement 211 removes any bottles 230 which have been incorrectly labeled as determined by the inspecting device.

The beverage bottling plant can be controlled by a central control arrangement 212, which could be, for example, computerized control system that monitors and controls the operation of the various stations and mechanisms of the beverage bottling plant.

Figure 5:
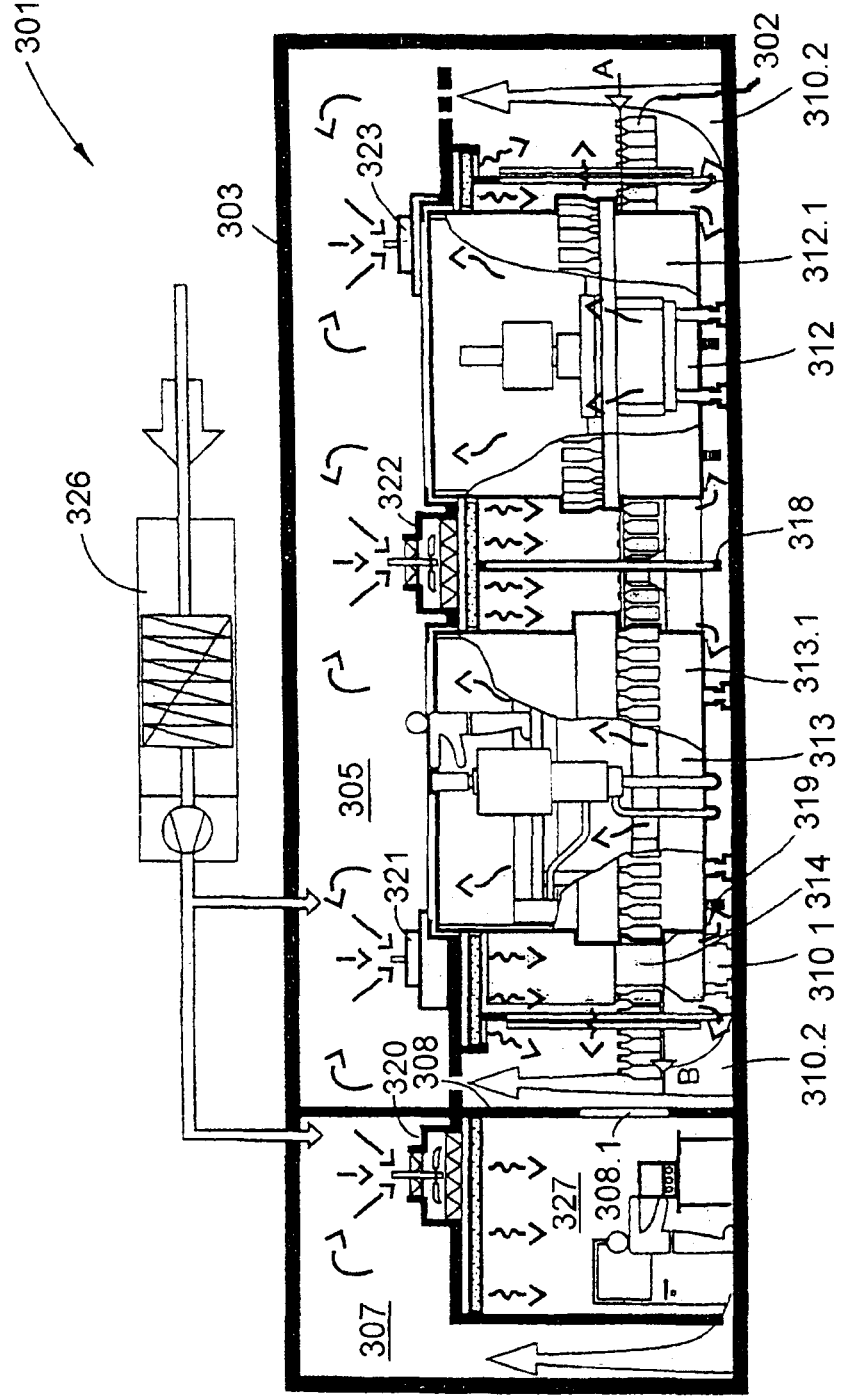
FIG. 5 is a simplified view in elevation of a plant comprising the wall parts which may utilize the device of the present application for the aseptic bottling of a liquid in bottles or similar containers.

The plant designated 301 in general in FIG. 5 is used for the aseptic bottling of a liquid in containers or bottles under clean room conditions, for example of a sensitive and/or highly perishable liquid such as a milk product, fruit juice or similar product, for example, or for the bottling of pharmaceutical products.

The plant 301 comprises essentially an outer housing 303 which encloses an interior which is essentially tightly closed from the exterior, and which is divided into an upper area and a lower area by a false floor/ceiling. The upper area forms, over the larger portion of the horizontal projection in FIG. 5, a plenum 305 (ceiling space or intermediate room) and an auxiliary room 307 which is separated from the plenum 305. Both the plenum 305 and the auxiliary room 307 are tall enough that the rooms can be entered by persons standing upright, e.g. to perform repair or maintenance work.

The space below the false floor/ceiling is divided by vertical walls 308 with sealed windows 308.1 into, among other things, a personnel entry airlock and a sterile space, which in the plant illustrated in FIG. 5 is located below the plenum 305. For its part, the sterile room is in turn divided by a partition or insulating wall that encloses the machines used in the plant 301 into an inner clean room area 310.1 and an outer security area 310.2.

The partition or insulating wall is realized, at least in part, in the form of a glass wall, so that the machines that are installed in the clean room segment 310.1 are visible from the security area 310.2, and thus the proper operation of these machines, among other things, can be observed.

In at least one possible embodiment of the application, the partition or insulating walls may be the partition walls according to the present application, which comprise the wall parts 2 and 2a an the gap plates 7a, 7b, and 7c.

In the illustrated embodiment, in the clean room area 310.1 there are a rinser 312 which, among other things, sterilizes the bottles 302 that have already been cleaned, a filling machine 313 to fill the sterilized bottles 302 with the liquid to be bottled, a capper 314 to close the bottles and transport devices to transport the bottles 302 between the rinser 312, the filling machine 313 and the capper 314. The rinser 312, the filling machine 313 and the capper 314 are all machines with a rotary design and a rotating rotor.

The empty bottles 302 are fed in the direction indicated by the Arrow A in FIG. 5 by means of a conveyor over the security area 310.2 and through an opening or lock in the wall to the rinser 312. The filled and capped bottles are transported away in the direction indicated by the Arrow B in FIG. 5 by means of the conveyor through an opening or airlock in the wall, first into the security area 310.2 and from there out of the housing 303.

The wall hermetically seals the clean room area 310.1, including the vicinity of the underside of the false floor/ceiling, off from the security area. In the vicinity of the floor, there are openings in the wall for the passage of air from the clean room area 310.1 into the security area 310.2.

The rinser 312 and the filling machine 313 each have a shield wall or cylindrical shield 312.1 or 313.1 that enclose the respective machine and/or its rotor. These shields are each essentially in the shape of a hollow cylinder that lies with its axis equi-axial with the vertical machine axis and is open on the bottom and top of the machine. Because the machines generally stand on the floor with feet, the lower edge or the bottom opening of each shield 312.1 or 313.1 is at some distance from the floor, so that between the floor and the lower edge of each shield 312.1 and 313.1 there is a ring-shaped opening for the entry of air from the space surrounding the respective machine into the interior of the shield 312.1 or 313.1. In the vicinity of the upper end, the shields 312.1 and 313.1 are connected in a sealed manner through the false floor/ceiling, where they are covered by a grid or screen 312.2 or 313.2, for example, so that although air can flow out of the interior of the respective cover 312.1 or 313.1 into the plenum 305, the false floor/ceiling is still accessible in the area of the shields 312.1 and 313.1.

The cylindrical shields 312.1 and 313.1 provide several advantages. In one possible embodiment, the cylindrical shields 312.1 and 313.1 can extend all the way to, and possibly beyond, the false floor/ceiling. Such a design essentially encloses the annular space above the rinser and the filling machine, thus minimizing the space of the clean room where sterile air needs to continuously be introduced and to continuously flow. Further, the cylindrical shields 312.1 and 313.1 minimize or substantially reduce the size of the clean room area where sterile air needs to continuously be introduced and to continuously flow. Without the shields 312.1 and 313.1, sterile air would need to occupy a substantially larger area of the clean room, which would require more work from the filters 321, 322, and 323 and distribution ducts associated with the filters 321, 322, 323. A smaller area to fill with sterile air would result in lower energy use, lower costs, and less wear and tear on the filters and distribution ducts, possibly resulting in fewer repairs and less maintenance work.

A further advantage of the extension of the cylindrical shields 312.1 and 313.1 to or beyond the false floor/ceiling is that access is permitted to the machines inside the shields for maintenance or repair purposes. Further, since the cylindrical shields 312.1 and 313.1 sit off the floor and create a ring-shaped space around their respective machines, sterile air is permitted to flow from the clean room area surrounding the shields 312.1 and 313.1, through the ring-shaped space. The air then moves upward into the inside of the shields, then out through vents in the false floor/ceiling. This special upward flow of sterile air permits repairs or maintenance to be performed to the machines on the inside of the shields 312.1 and 313.1 without contaminating the sterile air in the clean room.

A further advantage of the cylindrical shields 312.1 and 313.1 is the protection of the sterile air in the clean room area from contaminates which may be generated from the rinser or filling machine. Since the rinser and filling machine operate within the confines of the shields 312.1 and 313.1, and the air inside the shields flows up and out through a vent in the false floor/ceiling, any airborne contaminates generated by the machines flow out and away from the sterile environment. The machines are effectively substantially sealed off from the clean room area, and any contaminates produced during the machines' operation are essentially kept from entering the clean room area and contaminating the sterilized air therein.

In the clean room area 310.1 there are additional partitions 318 and 319, and in particular a partition 318 between the rinser 312 and the filling machine 313, as well as a partition 319 between the filling machine 313 and the capper 314. In the illustrated embodiment, the partitions each form air passage openings on the floor. They also have openings to make possible the transfer of bottles between the individual sections.

In the false floor/ceiling there are a plurality of filtering devices 320, 321, 322, and 323 to produce sterile air by filtering. The filtering devices 320, 321, 322, and 323 are used not only for filtering, but can also be used to heat or cool the air. In addition to a filter and a fan, in such an application there can also be a heating or cooling element that is formed by a heat exchanger.

By means of the filtering device 320, air is sucked out of the auxiliary space 307 and filtered, i.e. it is introduced into the personnel entry airlock in the form of sterile air. In the vicinity of the bottom, the personnel entry airlock has an air outlet opening that empties into a vertical air duct, by means of which the air can flow out of the personnel entry airlock back into the auxiliary room 307.

With the filter device 321, air is sucked out of the plenum 305 and filtered, i.e. the greater part of it is blown in the form of sterile air into the portion of the clean room area 310.1 that is occupied by the capper 314, and partly also into a hollow cylindrical shield of the capper 314, so that the working and capping area of the capper receive a constant flow of with sterile air. A small portion of the filtered sterile air supplied by the filter device 321 gets into the security area 310.2.

From the filtering device 322, air is sucked out of the plenum 305 and introduced filtered in equal parts on both sides of the partition 318, i.e. in the form of sterile air into the portion of the clean room area 310.1 occupied by the rinser 312 and into the area occupied by the filling machine 313. The filtering device 323 also sucks air out of the plenum 305 and introduces it into the portion of the clean room area 310.1 occupied by the rinser 312, and in particular so that at least a portion of the airflow generated by the filtering device 323 flows downward along the inside of the partition, and thereby also forms an air curtain at the airlock opening, at which the bottles 302 to be filled are transported in the upright position from the security area 310.2 into the clean room area 310.1 or to the rinser 312. A similar air curtain of filtered and sterile air is also formed at the airlock opening, at which the filled and capped bottles 302 travel out of the clean room area 310.1 into the security area 310.2

As illustrated by the arrow that represents the airflow, the majority of the airflow generated by the filtering devices 321, 322, and 323 flows upward via the interior of the shields 312.1 and 313.1 and then returns to the plenum 305 at the top of the respective shield. A portion of the airflow generated by the filtering devices 321, 322, and 323 also flows through the openings 16 out of the clean room area 310.1 into the security area 310.2 and, like the sterile air from the filtering device 321, is introduced directly into the security area 310.2 and flows back into the plenum 305 via ventilation openings provided in the false floor/ceiling.

In another possible embodiment, a portion of the airflow generated by the filtering devices 321, 322, and 323 also flows through the openings out of the clean room area 310.1 into the security area 310.2 and, like the sterile air introduced directly into the security area 310.2 by the filtering device 321, flows back into the plenum 305 via at least one ventilation opening provided in the false floor/ceiling.

In the exemplary embodiment illustrated, the filtering devices 321, 322, and 323 have distribution ducts respectively for an optimal air distribution on the underside of the false floor/ceiling.

By means of the air circulation system formed by the filtering devices 320, 321, 322, and 323, the spaces that are supplied by these devices are maintained at a specified temperature, for example at a room or air temperature in the range of approximately twenty to twenty-two degrees Celsius and at a specified relative humidity, which can be less than or equal to seventy percent, for example.

In FIG. 5, 326 is an external air-conditioning unit which, among other things, has a filter stage and an air-conditioning stage, and by means of which the plenum 305 and the auxiliary space 307 are supplied with filtered and air-conditioned fresh air, i.e. air set to a temperature preferably in the range between twenty degrees Celsius and twenty-two degrees Celsius and to a relative humidity of equal to or less than seventy percent.

The air-conditioning unit 326 as well as the individual filtering devices 320, 321, 322 and 323 are regulated so that the air pressure in the sterile space 310 is in any case higher than atmosphere pressure, and higher than the air pressure in the additional rooms adjacent to the sterile room 310, such as the plenum 305, the auxiliary room 307, the personnel entry airlock, etc. The external air-conditioning unit 326 and the filtering devices 320 are also regulated so that the pressure in the plenum 305, in the auxiliary room 307 and in the personnel entry airlock and in the rooms adjacent to them is above the atmospheric pressure outside the housing 303. The air-conditioning unit 326 compensates for the air losses that occur on account of, among other things, the openings for the introduction and removal of containers and caps into and from the clean room.

The plant 301 is designed so that in the clean room 310.1, the Clean Room Class 100 (approximately 35,000 particles per $m^3$ of air) required for aseptic production is achieved. On advantage of the plant 301, among others, is that the sterile space 310 itself has a relatively small volume, which significantly reduces, among other things, the costs for air conditioning and air treatment. An additional essential advantage is that in the event of any operational interruptions, the interiors of the shields 312.1 and 313.2 are accessible, i.e. repair and maintenance interventions can be carried out on the rinser 312 and on the filling machine 313, and namely via the upper cover 312.2 or 313.2 from the plenum 305. Because of the special routing of the airflow out of the areas surrounding the rinser 312 and the filling machine 313 upward through the shields 312.1 and 313.1, in the space 310 outside the shields, i.e. in the sterile area itself, the conditions of Clean Room Class 100 can be maintained even during repairs and maintenance operations on the rinser 312 and on the filling machine 313.

FIG. 5 also shows a working or waiting room 327 for the operating personnel. This room 327, which is also supplied with filtered, sterile air via a filtering device 320 from the auxiliary space 307, is accessible via the personnel entry airlock. The room 310 can be reached if necessary from the room 327 or via a corresponding door. In the partition 8 which also separates the room 327 from the room 310, there is also at least one view window 308.1.

With a device 1 for sealing vertical or substantially vertical joints 2 between plate-shaped wall elements 3, in one possible embodiment between wall surfaces of components forming a machine housing, such as glass panes or the like, in one possible embodiment the transition regions of such wall surfaces, panels or glass panes are to be in one possible embodiment easy to clean. This is achieved by the sealing being formed by a sealing cord 4 made of elastic material that seals the joint 2 and is clamped between the two joint ends.

One feature or aspect of an embodiment is believed at the time of the filing of this patent application to possibly reside broadly in a device 1 for sealing vertical or substantially vertical joints 2 between plate-shaped wall elements 3, in one possible embodiment between wall faces of components forming a machine enclosure, such as glass panels or the like, wherein the seal is formed by a sealing cord 4 that is made of a resilient material, said sealing cord sealing the joint 2 and being clamped between the two joint ends.

Another feature or aspect of an embodiment is believed at the time of the filing of this patent application to possibly reside broadly in the device, wherein the sealing cord 4 is provided on at least one of its free ends with a tensioning ball 6 that protects, in one possible embodiment, the edges of the glass panels.

Yet another feature or aspect of an embodiment is believed at the time of the filing of this patent application to possibly reside broadly in the device, wherein the sealing cord 4 is clamped at the outwardly facing outer edge of the ends of the abutting faces of the panel elements 3 in such a manner that when the jet of a high-pressure cleaning device impinges on the interior of the housing, the sealing cord 4 is able to yield.

Still another feature or aspect of an embodiment is believed at the time of the filing of this patent application to possibly reside broadly in the device, wherein the sealing cord 4 is secured at its upper end in a securing element 5 that engages over the joint to be sealed.

A further feature or aspect of an embodiment is believed at the time of the filing of this patent application to possibly reside broadly in the device, wherein the sealing cord 4 is realized for identifying danger areas in a signal color.

Another feature or aspect of an embodiment is believed at the time of the filing of this patent application to possibly reside broadly in the device, wherein the cross section of the sealing cord 4 is round or oval.

Yet another feature or aspect of an embodiment is believed at the time of the filing of this patent application to possibly reside broadly in the device, wherein the sealing cord 4 is used to adjust the pre-tensioning force in a threaded sleeve or the like at one end.

Still another feature or aspect of an embodiment is believed at the time of the filing of this patent application to possibly reside broadly in a machine enclosure configured to enclose machinery in a beverage bottling plant, said machine enclosure comprising: a plurality of glass panels being configured and disposed to dampen noise; each of said plurality of glass panels comprising a top portion and a bottom portion, which bottom portion is disposed below said top portion; each of said plurality of glass panels comprising an interior surface and an exterior surface; said interior surface being configured and disposed to face inwardly into said machine enclosure; said exterior surface being configured and disposed to face outwardly away from said machine enclosure; said plurality of glass panels comprising a pair of glass panels, which pair of glass panels are disposed adjacent to one another; said pair of glass panels comprising a first glass panel and a second glass panel; a resilient sealing cord being configured and disposed to seal a gap between said first glass panel and said second glass panel; a sealing cord securing element being configured and disposed to: hold said first glass panel and said second glass panel together; secure said resilient sealing cord adjacent said top portion of said first glass panel and said top portion of said second glass panel; and secure said resilient sealing cord adjacent said exterior surface of said first glass panel and said second glass panel; a first sealing cord tensioning element being configured and disposed to: tension said cord sufficiently highly to seal the gap between said first glass panel and said second glass panel upon operation of machinery in said machine enclosure and prior to pressurized cleaning fluid impinging upon said interior surfaces of said pair of glass panels and said resilient sealing cord; hold said resilient sealing cord between said top portion of said first glass panel and said top portion of said second glass panel; and protect an upper corner of said first glass panel and an upper corner of said second glass panel; a second sealing cord tensioning element being configured and disposed to: tension said cord sufficiently highly to seal the gap between said first glass panel and said second glass panel upon operation of machinery in said machine enclosure and prior to pressurized cleaning fluid impinging upon said interior surfaces of said pair of glass panels and said resilient sealing cord; hold said resilient sealing cord between said bottom portion of said first glass panel and said bottom portion of said second glass panel; and protect a lower corner of said first glass panel and a lower corner of said second glass panel; said resilient sealing cord being tensioned sufficiently loosely to permit said resilient sealing cord to yield, upon pressurized cleaning fluid impinging upon said interior surfaces of said pair of glass panels and said resilient sealing cord, and permit cleaning of said machine enclosure and permit fluid to flow through a gap between said first glass panel and said second glass panel and said resilient sealing cord, from inside said machine enclosure to outside said machine enclosure.

A further feature or aspect of an embodiment is believed at the time of the filing of this patent application to possibly reside broadly in the machine enclosure, wherein: said first sealing cord tensioning element is configured and disposed to protect the edges of said first glass panel and said second glass panel; and said second sealing cord tensioning element is configured and disposed to protect the edges of said first glass panel and said second glass panel.

Another feature or aspect of an embodiment is believed at the time of the filing of this patent application to possibly reside broadly in the machine enclosure, wherein said sealing cord is realized for identifying danger areas in a signal color.

Yet another feature or aspect of an embodiment is believed at the time of the filing of this patent application to possibly reside broadly in the machine enclosure, wherein the cross section of said sealing cord is round or oval.

Still another feature or aspect of an embodiment is believed at the time of the filing of this patent application to possibly reside broadly in the he machine enclosure according to Claim 4, wherein: said first sealing cord tensioning element comprises a threaded sleeve; said second sealing cord tensioning element comprises a threaded sleeve; and said threaded sleeve of said first sealing cord tensioning element and said threaded sleeve of said second sealing cord tensioning element are configured to adjust the pre-tensioning force of said sealing cord.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of wall supports and/or partitions supports, which may possibly be utilized or adapted for use with at least one possible embodiment of the present application, may possibly be found in the following U.S. Pat. No. 3,986,314, having the title "Ceiling assembly with removable partition walls," published on Oct. 19, 1976; U.S. Pat. No. 4,344,475, having the title "Office partition interconnector assembly," published on Aug. 17, 1982; No. 5,228,254, having the title "Wall system," published on Jul. 20, 1993; No. 6,799,404, having the title "Wall panel assembly and method of assembly," published on Oct. 5, 2004; No. 7,093,398, having the title "Wall panel assembly and method of assembly," published on Aug. 22, 2006; and No. 7,448,945, having the title "Clean work booth," published on Nov. 11, 2008.

The following patents, patent applications or patent publications, are hereby incorporated by reference as if set forth in their entirety herein except for the exceptions indicated herein: DE 197 23 954 A, having the following English translation of the German title, "Clean room," published on Mar. 26, 1998; and DE 20 2004 001 619 U, having the following English translation of the German title, "Plant for filling bottles under aseptic conditions with foodstuffs or pharmaceuticals comprises filling machine and sealing machine in clean room environment, each machine having housing connected to air outlet," published on May 19, 2204.

U.S. patent application Ser. No. 12/818,801, filed on Jun. 18, 2010, having inventor Thomas DETEMPLE, and title "BEVERAGE BOTTLING PLANT OR FOODSTUFF CONTAINING ELEMENT FILLING PLANT EACH HAVING A CLEAN ROOM AND EACH HAVING APPARATUS FOR ASSISTING IN THE CLEANING OF THE CLEAN ROOM, AND A METHOD OF CLEANING THE CLEAN ROOM," and its corresponding Federal Republic of Germany Patent Application No. 10 2007 062 813.9, filed on Dec. 21, 2007, and International Patent Application No. PCT/EP2008/009918, filed on Nov. 22, 2008, having WIPO Publication No. WO 2009/083072 and inventor Thomas DETEMPLE are hereby incorporated by reference as if set forth in their entirety herein.

All of the patents, patent applications or patent publications, except for the exceptions indicated herein, which were cited in the German Office Action dated Dec. 10, 2008, and/or cited elsewhere are hereby incorporated by reference as if set forth in their entirety herein, as follows: DE 71 39 295, having the German title "Dichtungsschnur fuer Dehnungsfugen in Bauwerken," published on Feb. 3, 1972.

All of the patents, patent applications or patent publications, except for the exceptions indicated herein, which were cited in the International Search Report dated Feb. 18, 2009, and/or cited elsewhere are hereby incorporated by reference as if set forth in their entirety herein, as follows: U.S. Pat. No. 4,223,660, having the title "REMOVABLE OVEN DOOR GASKET," published on Sep. 23, 1980; and DE 938 281, having the German title "Schutzvorrichtung," published on Jan. 26, 1956.

The patents, patent applications, and patent publications listed above in the preceding paragraphs are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2008 005 606.5, filed on Jan. 22, 2008, having inventor Thomas DETEMPLE, and DE-OS 10 2008 005 606.5 and DE-PS 10 2008 005 606.5, and International Application No. PCT/EP2008/009080, filed on Oct. 28, 2008, having WIPO Publication No. WO 2009/092407 and inventor Thomas DETEMPLE, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, except for the exceptions indicated herein, are hereby incorporated by reference as if set forth in their entirety herein.

The purpose of incorporating the corresponding foreign equivalent patent application(s), that is, PCT/EP2008/009080 and German Patent Application 10 2008 005 606.5, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2008/009080 and DE 10 2008 005 606.5 from which this patent application claims priority which do not have to do with the correction of the translation in this patent application are not to be included in this patent application in the incorporation by reference.

Any statements about admissions of prior art in the original foreign patent applications PCT/EP2008/009080 and DE 10 2008 005 606.5 are not to be included in this patent application in the incorporation by reference, since the laws relating to prior art in non-U.S. Patent Offices and courts may be substantially different from the Patent Laws of the United States.

All of the references and documents cited in any of the documents cited herein, except for the exceptions indicated herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A sealing device comprising:
   a resilient sealing cord being positionable in a sealing position against two plate-shaped panels of a machine enclosure, said machine enclosure comprising an inside and an outside, which panels comprise at least one of: wall panels and glass panels, to seal an elongated gap between the panels;
   first and second tensioning elements connected to first and second ends of said sealing cord; and
   said tensioning elements, upon installation, produce a tension on said sealing cord that is:
   sufficiently high to secure said sealing cord in its sealing position;
   sufficiently low to allow lifting of at least a portion of said sealing cord out of its sealing position toward the outside of the machine enclosure upon impingement by a pressurized spray of cleaning fluid to permit at least a portion of the spray of cleaning fluid to spray through the elongated gap from inside the machine enclosure to the outside, such that particles of dirt are removed and transported by the spray of cleaning fluid from the inside of the machine enclosure to the outside; and
   sufficiently high to move said sealing cord back into its sealing position by said tension upon stopping of impingement by the spray of cleaning fluid.

2. The sealing device according to claim 1, wherein:
   said second tensioning element comprises a tensioning ball to contact adjacent end faces of the panels; and
   said sealing cord is tensionable and upon tensioning then held in position by said tensioning ball.

3. The sealing device according to claim 2, wherein said first tensioning element comprises a securing element that is to extend over and across the elongated gap to contact both of the panels.

4. The sealing device according to claim 3, wherein said sealing cord comprises a round or oval cross-section, and said sealing cord comprises a signal color to identify hazardous or dangerous areas.

5. The sealing device according to claim 1, wherein:
said second tensioning element comprises a thread;
said sealing device comprises a threaded sleeve connected to said first end of said sealing cord; and
said threaded sleeve is to be screwed into said second tensioning element to tension and hold said sealing cord.

6. The sealing device according to claim 5, wherein said first tensioning element comprises a securing element that is to extend over and across the elongated gap to contact both of the panels.

7. The sealing device according to claim 6, wherein said sealing cord comprises a round or oval cross-section, and said sealing cord comprises a signal color to identify hazardous or dangerous areas.

8. The sealing device according to claim 1, wherein said tensioning elements are attachable to said sealing cord.

9. The sealing device according to claim 8, wherein:
said second tensioning element comprises a tensioning ball;
said tensioning ball comprises an opening to receive said second end of said sealing cord therein; and
said tensioning ball comprises a clamping pin to clamp said second end of said sealing cord in said tensioning ball.

10. The sealing device according to claim 9, wherein:
said first tensioning element comprises a securing element that is to extend over and across the elongated gap to contact both of the panels; and
said securing element comprises a passage therein to permit said sealing cord to pass therethrough.

11. The sealing device according to claim 8, wherein:
said second tensioning element comprises a thread;
said sealing device comprises a threaded sleeve connected to said second end of said sealing cord; and
said threaded sleeve is to be screwed into said second tensioning element to tension and hold said sealing cord.

12. The sealing device according to claim 11, wherein:
said first tensioning element comprises a securing element that is to extend over and across the elongated gap to contact both of the panels; and
said securing element comprises a passage therein to permit said sealing cord to pass therethrough.

13. The sealing device according to claim 12, wherein said sealing cord comprises a round or oval cross-section.

14. The sealing device according to claim 8, wherein:
said second tensioning element comprises a tensioning ball;
said tensioning ball comprises an opening to receive said second end of said sealing cord therein; and
said tensioning ball comprises a clamping pin to clamp said second end of said sealing cord in said tensioning ball.

15. The sealing device according to claim 8, in combination with wherein said wall or glass panels comprise two plate-shaped panels to form a portion of an said enclosure.

16. The sealing device according to claim 15, wherein:
said second tensioning element comprises a tensioning ball;
said tensioning ball comprises an opening to receive said second end of said sealing cord therein; and
said tensioning ball comprises a clamping pin to clamp said second end of said sealing cord in said tensioning ball.

17. The sealing device according to claim 16, wherein:
said first tensioning element comprises a securing element that is to extend over and across the elongated gap to contact both of the panels; and
said securing element comprises a passage therein to permit said sealing cord to pass therethrough.

18. The sealing device according to claim 1, wherein said sealing cord comprises a diameter that is greater than a width of the elongated gap between the panels.

19. The sealing device according to claim 18, wherein:
said sealing device comprises a securing element that is clipped onto the panels;
said first tensioning element, upon installation, presses against said securing element; and
said securing element comprises a passage therein having a diameter sufficient to permit said sealing cord to pass therethrough.

\* \* \* \* \*